United States Patent [19]

Cashwell

[11] 4,404,452
[45] Sep. 13, 1983

[54] OPTICAL PERFORATING APPARATUS AND SYSTEM

[75] Inventor: Ernest Cashwell, Richmond, Va.

[73] Assignee: Philip Morris Incorporated, New York, N.Y.

[21] Appl. No.: 375,741

[22] Filed: May 6, 1982

Related U.S. Application Data

[63] Continuation of Ser. No. 46,808, Jun. 8, 1979, abandoned.

[51] Int. Cl.$^3$ .............................................. B23K 27/00
[52] U.S. Cl. ...................... 219/121 LK; 219/121 LQ; 219/121 LR; 219/121 LT
[58] Field of Search ................. 219/121 LK, 121 LL, 219/121 LP, 121 LQ, 121 LR, 121 LS, 121 LT, 121 LY; 350/285

[56] References Cited

U.S. PATENT DOCUMENTS

| | | | |
|---|---|---|---|
| 2,012,352 | 8/1935 | Rusting et al. | 352/206 |
| 2,547,623 | 4/1951 | Cockrell | 346/33 |
| 2,844,648 | 7/1958 | Rosenthal | 358/293 |
| 2,875,017 | 2/1959 | Reynolds | 346/109 |
| 2,930,669 | 3/1960 | Licklider | 346/109 |
| 3,022,704 | 2/1962 | Cary | 356/324 |
| 3,154,370 | 10/1964 | Johnson | 346/108 |
| 3,175,196 | 3/1965 | Lee, Jr. et al. | 340/173 |
| 3,220,013 | 11/1965 | Harris | 346/107 |
| 3,226,527 | 12/1965 | Harding | 219/384 |
| 3,256,524 | 6/1966 | Stauffer | 346/762 |
| 3,262,122 | 7/1966 | Fleisher et al. | 346/1 |
| 3,303,739 | 2/1967 | Chitayat | 350/286.2 |
| 3,314,073 | 4/1967 | Becker | 346/76 |
| 3,325,819 | 3/1965 | Fraser | 346/76 |
| 3,348,233 | 10/1967 | Hertz | 346/76 |
| 3,389,403 | 6/1968 | Cottingham et al. | 346/108 |
| 3,463,898 | 8/1969 | Takaoka et al. | 219/121 L |
| 3,474,457 | 10/1969 | Becker | 346/76 |
| 3,482,254 | 12/1969 | Harrison et al. | 346/76 |
| 3,524,046 | 8/1970 | Brouwer | 219/384 |
| 3,528,424 | 9/1970 | Ayres | 128/303.1 |
| 3,537,306 | 11/1970 | Bedinger | 73/170 |
| 3,543,183 | 11/1970 | Heimann | 372/108 |
| 3,619,028 | 11/1971 | Keene | 350/285 X |
| 3,622,740 | 11/1971 | Ravussin et al. | 219/121 L |
| 3,658,422 | 4/1972 | Wilkinson | 356/89 |
| 3,787,121 | 1/1974 | Lowy et al. | 356/93 |
| 3,819,277 | 6/1974 | Berthelot et al. | 356/204 |
| 3,826,578 | 7/1974 | King et al. | 356/537 |
| 3,838,912 | 10/1974 | Arimoto et al. | 350/285 |
| 3,901,601 | 8/1975 | Lahmann | 356/97 |
| 3,943,324 | 3/1976 | Haggerty | 219/121 L |
| 3,985,420 | 10/1976 | Grose | 350/7 |
| 3,993,402 | 11/1976 | Frederick, Jr. | 350/285 |
| 4,083,629 | 4/1978 | Kocher et al. | 219/121 L X |
| 4,115,683 | 9/1978 | Clark et al. | 219/121 L |
| 4,118,619 | 10/1978 | McArthur et al. | 219/121 L |
| 4,121,595 | 10/1978 | Heitmann et al. | 219/121 L X |
| 4,125,755 | 11/1978 | Plamquist | 219/121 L |
| 4,153,369 | 5/1979 | Kallet et al. | 356/318 |
| 4,218,606 | 8/1980 | Whitman | 219/121 L |

FOREIGN PATENT DOCUMENTS

| | | |
|---|---|---|
| 2828754 | 2/1979 | Fed. Rep. of Germany . |
| 2754104 | 6/1979 | Fed. Rep. of Germany . |
| 2320918 | of 0000 | France . |
| 2379992 | of 0000 | France . |
| 2399374 | of 0000 | France . |
| 2439643 | of 0000 | France . |
| 51-134996 | 11/1976 | Japan . |
| 103363 | of 0000 | Japan . |
| 53-11786 | 3/1978 | Japan . |
| 7514132 | of 0000 | Netherlands . |
| 925798 | 5/1963 | United Kingdom . |
| 1368819 | 10/1974 | United Kingdom . |
| 1455327 | 11/1976 | United Kingdom . |
| 2015813A | 9/1979 | United Kingdom . |
| 2032325 | 5/1980 | United Kingdom . |

OTHER PUBLICATIONS

Grimm, M. A., "Optical System for Laser Machining of Narrow Slots", *IBM Tech. Disc. Bull.*, vol. 14, No. 9, Feb. 1972, pp. 2641–2642.

Klauser, H. E., "Laser Micromachine," *IBM Tech. Disc. Bull.*, vol. 21, No. 11, Apr. 1979, pp. 4431–4432.

Kremen, S. H., "Prism Deflector for Laser Machining," *IBM Tech. Bull.*, vol. 8, No. 6, Nov. 1965, p. 882.

*Primary Examiner*—C. L. Albritton
*Attorney, Agent, or Firm*—Robert M. Shaw

[57] ABSTRACT

Optical perforation apparatus including a rotatable assembly having first and second light reflective means supported in spaced succession for rotation about the assembly rotational axis. Each light reflective means is provided with light reflective elements arranged in a locus about the rotational axis. At least one of the means is additionally provided with light transmissive portions each arranged between mutually disposed of its light reflective elements and in alignment with a light reflective element of the other means. The light reflective elements of each means are further arranged at non-orthogonal angles to the assembly axis, thereby permitting parallel orientation of the latter axis and the laser beam.

6 Claims, 5 Drawing Figures

OPTICAL PERFORATING APPARATUS AND SYSTEM

This is a continuation of application Ser. No. 46,808, filed June 8, 1979, now abandoned.

FIELD OF THE INVENTION

This invention pertains to optical systems and, in particular, to optical systems for perforating sheet material to obtain a precise perforation pattern or matrix.

BACKGROUND OF THE INVENTION

Perforation systems for perforating various types of sheet material have been utilized in a variety of fields. One particular field in which systems of this type have been used is the field of cigarette manufacture. In cigarette manufacture, perforating systems are employed to perforate cigarette rod paper and/or cigarette filter tipping paper to provide cigarettes having preselected dilution characteristics. Perforation systems for this purpose must be capable of providing precise and uniform perforation patterns or matrices to achieve with consistency the desired dilution characteristics.

To date mechanical puncture systems and electric arc systems have been developed for cigarette paper perforation. With these systems, individual perforating elements provide perforations for a particular row of a perforation pattern and uniformity of the pattern is ensured by synchronizing operation of the perforating elements. Another type of system for perforating cigarette paper involves the use of laser beams. Systems of this type have employed single or multiple laser beam sources and controlled movement of these sources and the paper to realize perforation patterns having the desired precision. Laser beam practices have also been proposed wherein beam splitting optical components provide a multiple of component beams which are focussed on the paper to provide multiple perforations.

Another laser beam perforating practice is also known wherein multiple perforations are realized by confronting the laser beam successively alternately with reflective members. This practice utilizes a rotatable disc assembly comprised of a plurality of discs mounted in spaced relationship along the assembly rotational axis. Each disc is provided about its periphery with a plurality of flat reflective facets arranged at an orthogonal attitude to the assembly rotational axis and mutually spaced by light transmissive portions. The discs are of increasing diameter and misaligned such that each reflective facet of a given disc is aligned with light transmissive portions of the remaining discs. In this manner, rotation of the disc assembly with its rotational axis angled to the path of the laser beam results in successive alternate issuance of the beam from the facets of the different discs. With this practice, spacing the discs may be varied to meet particular perforation pattern spacing requirements.

In another known laser perforating practice employing a disc assembly, successive discs are arranged along the assembly rotational axis in abutting relationship and the discs are provided with reflective facets mutually spaced by light transmissive portions. In this case, the discs are of equal diameter and the facets of the forward disc are at an orthogonal attitude relative to the assembly axis, while those of the rearward disc are at a non-orthogonal attitude relative thereto. Disposition of the rotating assembly angled to the laser beam, again results in successive alternate issuance of the beam from the reflective facets of the different discs.

While the above-discussed laser perforating systems utilizing rotatable disc assemblies are advantageous over prior laser systems from the standpoint of speed of operation and maximum utilization of the laser energy, alternative systems which enable more suitable physical arrangement of the system components and attendant ease of manufacture would be desirable.

It is therefore a broad object of the present invention to provide a laser beam perforating system having features promotive of more suitable physical disposition of system components.

SUMMARY OF THE INVENTION

In accordance with the principles of the present invention, the above and other objectives are realized in a perforating system employing a beam of optical energy, perferably a laser beam, and comprising a rotatable assembly including first and second reflective means supported in immediate spaced succession for rotation about the rotational axis of the assembly and each having light reflective elements arranged in a locus about and at a non-orthogonal attitude to the assembly rotational axis. At least the first light reflective means is further provided with light transmissive portions between its successive light reflective elements and this first light reflective means is situated such that its light transmissive portions are in alignment with light reflective elements of the second reflective means. In the course of assembly rotation, a beam of optical energy, preferably a laser beam, having its axis parallel to the assembly rotational axis is confronted by the reflective elements of the first and second rotating reflective means, whereby the beam is successively alternately reflected thereby.

With the present perforating system, the assembly rotational axis and the laser beam are in parallel alignment promoting ease of arrangement of the assembly and laser source. In the perforation of a moving web of paper, the web is also maintainable in parallel orientation with the rotational axis and the beam, further promoting ease of assembly arrangement.

In preferred form, the second reflective means is also provided with light transmissive portions between its successive light reflective elements and these light transmissive portions are in alignment with the light reflective elements of the first means. In this form, the first and second reflective means are discs of equal diameter which similarly taper in radial extent along their respective axes. Apertures extending axially through the tapered disc surfaces form the light transmissive portions and define therebetween surface portions forming the reflective elements. The discs are similar, thereby facilitating disc production.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
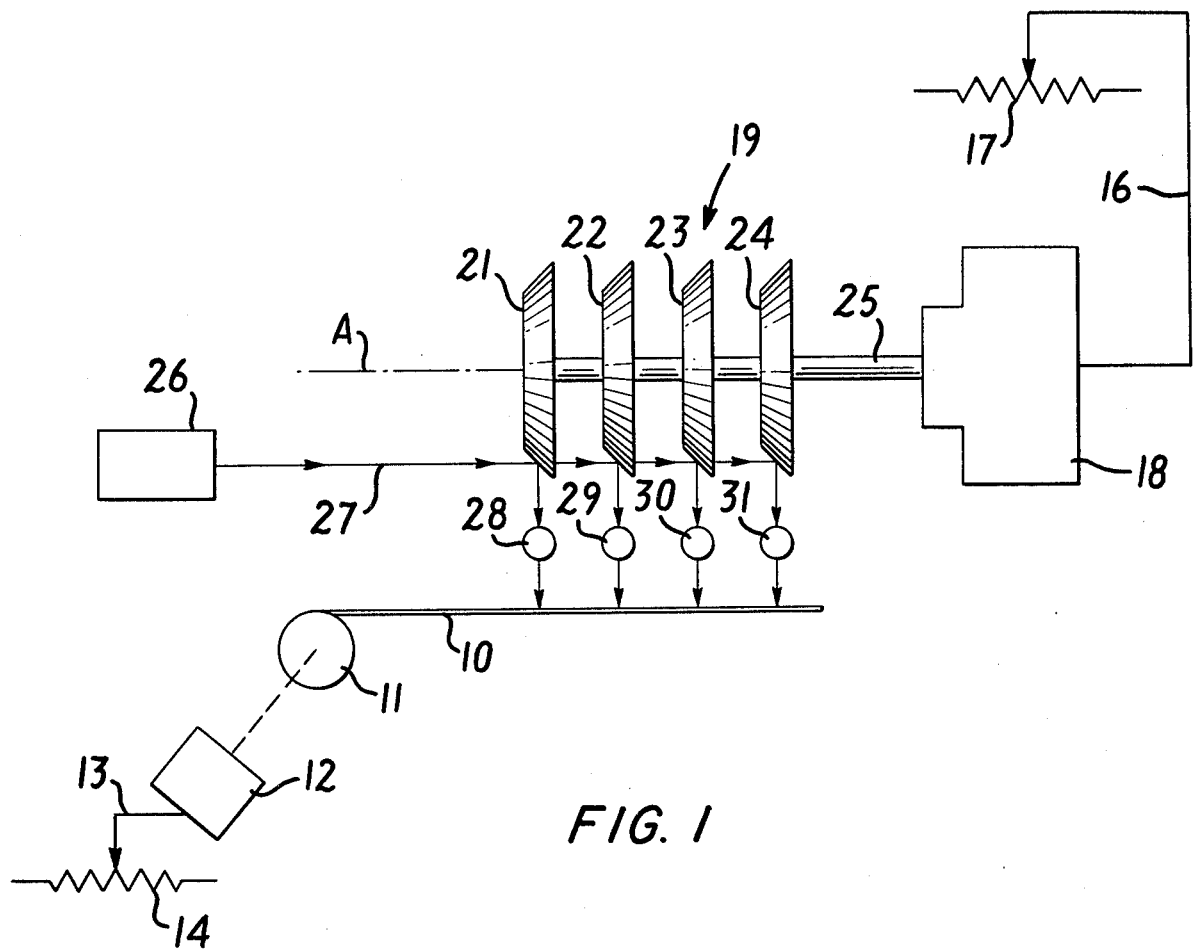
FIG. 1 is a block diagrammatic view of a perforating system in accordance with the principles of the present invention.

In FIG. 1, a web 10 of sheet material to be perforated is collected by a take-up drum 11 following horizontal transport from a payout drum, not shown. Take-up drum 11 is rotated by drive unit 12 with a drum speed being established by a control signal provided on line 13 as furnished by potentiometer 14 or like settable device. A further control signal derived on line 16 from potentiometer 17 controls drive unit 18 of rotatable light-reflector assembly 19. The latter assembly includes a plurality of rotatable light reflective discs which, in the present illustrative case, are shown as four discs 21, 22, 23 and 24 of similar configuration. The discs 21-24 are arranged in immediate spaced succession along the assembly rotational axis A. A shaft 25 situated along the axis A is rotated by the drive unit 18, and the discs are keyed thereto for rotation therewith.

Laser 26 generates a continuous output beam 27 in parallel relation with the reflector assembly rotational axis at a location adjacent the discs 21-24. Light beams reflected by the discs are conducted by respective focussing lenses 28-31, to the web 10.

Figure 2:
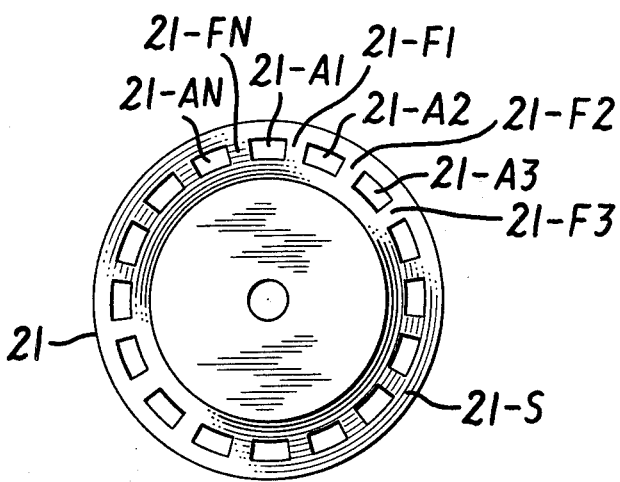
FIG. 2 is a front view of a disc employed in the system of FIG. 1.
Figure 3:
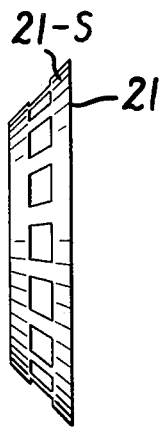
FIG. 3 is a side elevation view of the disc of FIG. 1.

FIGS. 2 and 3 show front and side elevation views of the disc 21. As shown, the disc is tapered of beveled along its axial length to define a surface 21-S which is at a non-orthogonal attitude to the assembly rotational axis when the disc is keyed to the shaft 25. Typically, the disc might be tapered at 45° so as to result in a 45° angle between the surface 21-S and the rotational axis A. Spaced about the periphery of the surface 21-S and extending through the disc are a plurality of circumferentially spaced light-transmissive portions, shown as apertures 21-A1 to 21-AN. These light transmissive portions define light reflective elements or facets 21-F1 to 21-FN therebetween. As above-noted, the discs 22-24 are of similar configuration to the disc 21, and therefore, also have aperture and reflective facet configurations, as shown in FIGS. 2 and 3.

Figure 4:
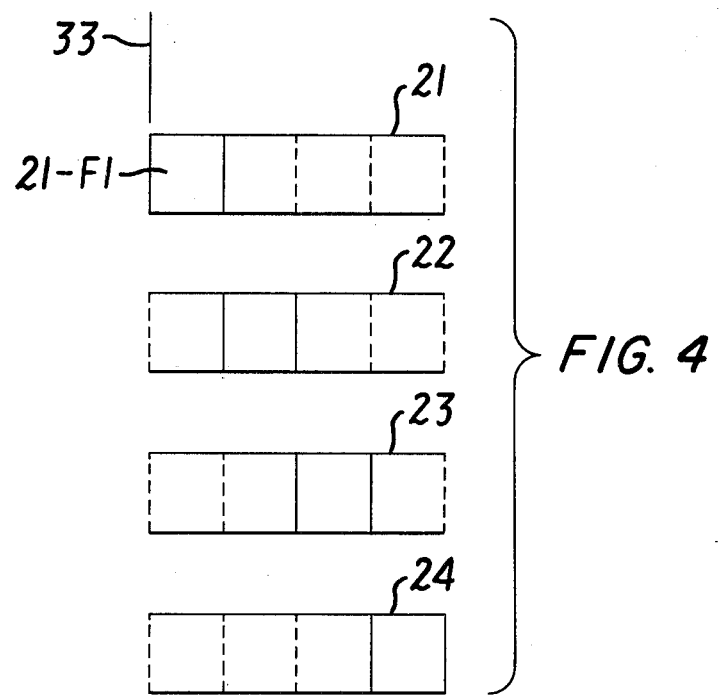
FIG. 4 is a diagrammatic presentation showing the manner of alignment of the discs employed in the system of FIG. 1.

The four discs, 21-24 are keyed in misaligned orientation to the shaft 25 so as to result in successive alternate reflection of the beam 27 in a preselected sequence upon rotation of the assembly 19. FIG. 4 illustrates one misaligned orientation wherein reflection of the beam 27 occurs in the sequence of discs 21, 22, 23 and 24.

In FIG. 4, the circumferential surface of each of the discs 21-24 is shown relative to a line 33 running parallel to the left edge of the first facet 21-F1 of the disc 21. For convenience, only a surface portion equal to a single facet to facet spacing is actually depicted, this circumferential portion being repeated around the disc. Also for convenience, the disc aperture sections have been segmented by dashed lines into reflective facet length portions. Moving rightward from the line 33 the disc 21 contains a first relative facet followed by three facet length apertures. The disc 22 contains a first facet length aperture followed by a facet which itself is followed by two facet length apertures. The disc 23 is the reverse of the disc 22 and contains two reflective facet length apertures followed by a facet and a succeeding facet length aperture. Finally, the disc 24 is the reverse of disc 1 and has 3 facet length apertures followed by a reflective facet.

With the discs 21-24 misaligned as in FIG. 4, the beam 27 is first reflected by the disc 21 through confrontation with the facet 21-F1. Subsequent rotation of the assembly 19 brings the beam 27 into alignment with the first facet length aperture section of the disc 21 and with the first reflective facet of the disc 22, resulting in reflection of the beam from the latter disc. Again, further rotation of the assembly brings facet length apertures of both discs 21 and 22 into alignment with the beam and the first reflective facet of the disc 23. Reflection from the disc 23 thereby occurs. Finally, continued rotation brings the beam 27 into alignment with facet length apertures of the three discs 21-23 and the reflective facet of the disc 24 causing reflection of the beam by the latter. As can be appreciated, with the illustrative disc misalignment of FIG. 4, the beam 27 will issue successively from the dics in the order of discs 21-24 and this will be repeated for successive circumferential disc lengths.

Figure 5:
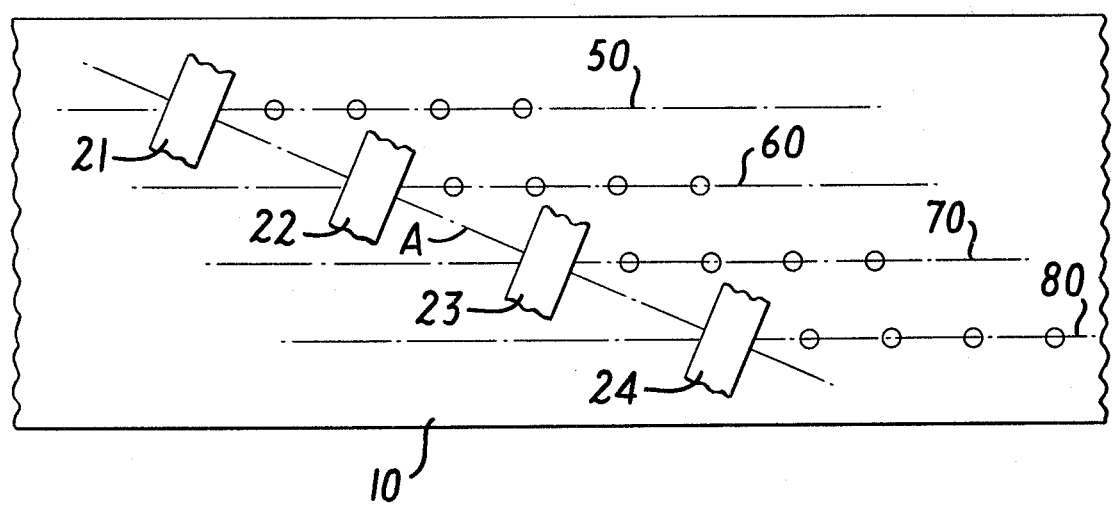
FIG. 5 is a plan elevation of the system of FIG. 1.

Referring to FIG. 3, each configuration of the beam 27 with the reflective facets of the discs 21-24 results in the production of reflective beams 21-1 through 21-4, these beams being focussed by the lenses 28-31 to the positions 32, 33, 34, and 35 on the web 10. As shown in FIG. 5, these reflected beams result in perforation rows 50, 60, 70 and 80 in the medium 10.

The disc assembly 19, while orientated with its rotational axis A in a plane parallel to the web 10, can be positioned with its axis at various transverse angles to the web axis. The particular angle selected will depend upon the desired row-to-row spacing of the resultant perforation rows 50, 60, 70 and 80. This spacing will also be a function of the axial spacing between the discs. In practice, the latter spacing and the angular orientation of the assembly 19 will be adjusted to provide the required row-to-row spacing and matrix pattern.

As shown in FIGS. 2 and 3, the reflective facets defined by the regions between the apertures of the discs are of slightly curved configuration. Other facet configurations arranged at a non-orthogonal attitude to the assembly axis may also be employed. Thus, for example, planar configurations may be employed. This may be accomplished by providing the discs with flat surfaces between successive apertures either by machining the discs or by affixing thereto flat mirrors. Additionally, the facets might also be cupped or otherwise configured to minimize divergence.

As can be appreciated, with the reflective facets of the perforating assembly 19 at non-orthogonal attitudes to the assembly rotational axis, such axis and the beam 27 are maintainable in parallel, thereby permitting like orientation of both the laser source and the assembly. Fabrication of the apparatus and component alignment are thus facilitated. Similarly, the web 10 can also be orientated in a plane parallel to the beam and assembly axis, whereby fabrication and alignment are further facilitated. Attendant the present apparatus is, therefore, manufacture and alignment simplification, this being additionally aided by the use of similar disc configurations.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for perforating a web of sheet material comprising:
   means for generating a beam of optical energy;
   an assembly rotatable about a rotational axis parallel to the axis of said beam, said assembly including:
      first and second light reflective means supported in immediate spaced succession along said rotational axis, said first light reflective means having first cupped light reflective elements arranged in a first locus about and at a non-orthogonal attitude to said rotational axis, said second light reflective means having second cupped light reflective elements arranged in a second locus about and at a non-orthogonal attitude to said rotational axis;
      said first light reflective means further having first light transmissive portions each situated on said first locus between mutually disposed ones of said first light reflective elements and being disposed such that each of said first light transmissive portions is in registry with a corresponding one of the second cupped light reflective elements of said second light reflective means;
      said rotational axis being spaced from said beam axis such that as the assembly rotates about said rotational axis the beam is successively alternately reflected by the first and second light reflective elements; and
   means for transporting a web of sheet material in light receiving relation to said first and second reflective means and in parallel relation to said rotational axis.

2. Apparatus in accordance with claim 1 wherein:
   said beam of optical energy is a laser beam; and
   said first and second reflective means comprise first and second discs, respectively, arranged perpendicular to and with their axes along said rotational axis.

3. Apparatus in accordance with claim 2 wherein:
   said first disc is tapered in radial extent along its axis to define a first tapered surface;
   said first disc has first light transmissive apertures extending therethrough and opening out of said first tapered surface to define said first light transmissive portions of said first reflective means, the portions of said first tapered surface between mutually disposed ones of said first light transmissive apertures being cupped and defining said first light reflective elements of said first reflective means; and
   said second disc is tapered in radial extent along its axis to define a second tapered surface, said second light reflective elements of said second reflective means being defined by cupped portions of said second tapered surface.

4. Apparatus in accordance with claim 3 wherein:
   said first and second discs are of equal diameter and said first and second tapered surfaces are equally tapered.

5. Apparatus in accordance with claim 4 wherein:
   said second disc has second light transmissive apertures extending therethrough and each opening out of said second tapered surface between mutually disposed ones of said second light reflective elements; and
   each of said second light transmissive apertures is in registry with a corresponding one of said reflective element defining portions of said first tapered surface.

6. Apparatus in accordance with claim 2, 3 or 4 wherein:
   said assembly further includes:
   a rotatable shaft disposed along said rotational axis and to which said discs are keyed for rotation therewith.

* * * * *